J. J. M. A. E. SCHNEIDER.
ARMING OF FIGHTING AND OTHER AEROPLANES.
APPLICATION FILED MAY 10, 1920.

1,383,242.

Patented June 28, 1921.

J. J. M. A. E. SCHNEIDER.
ARMING OF FIGHTING AND OTHER AEROPLANES.
APPLICATION FILED MAY 10, 1920.
1,383,242.
Patented June 28, 1921.
10 SHEETS—SHEET 3.
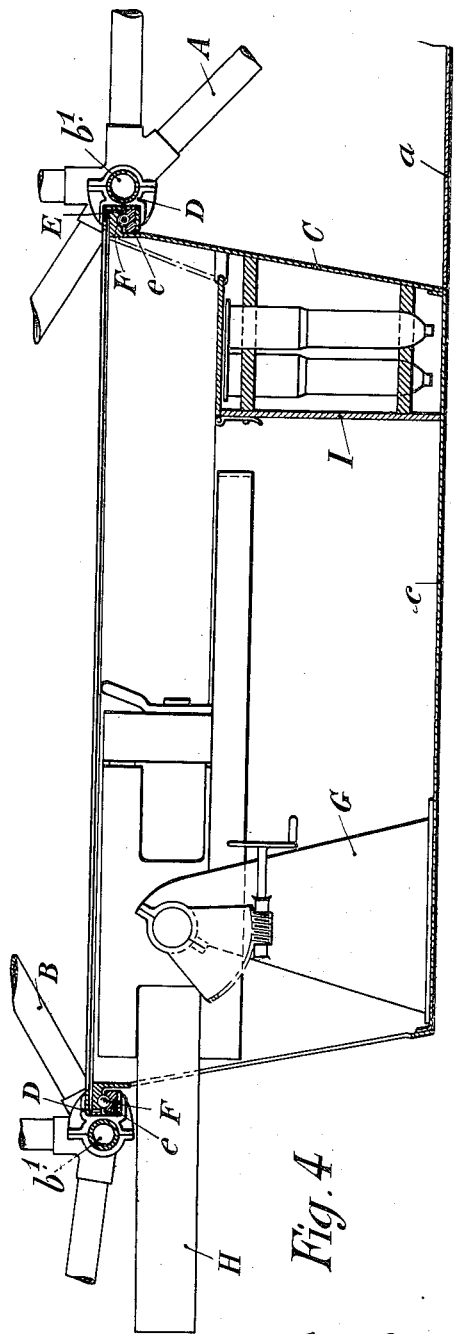

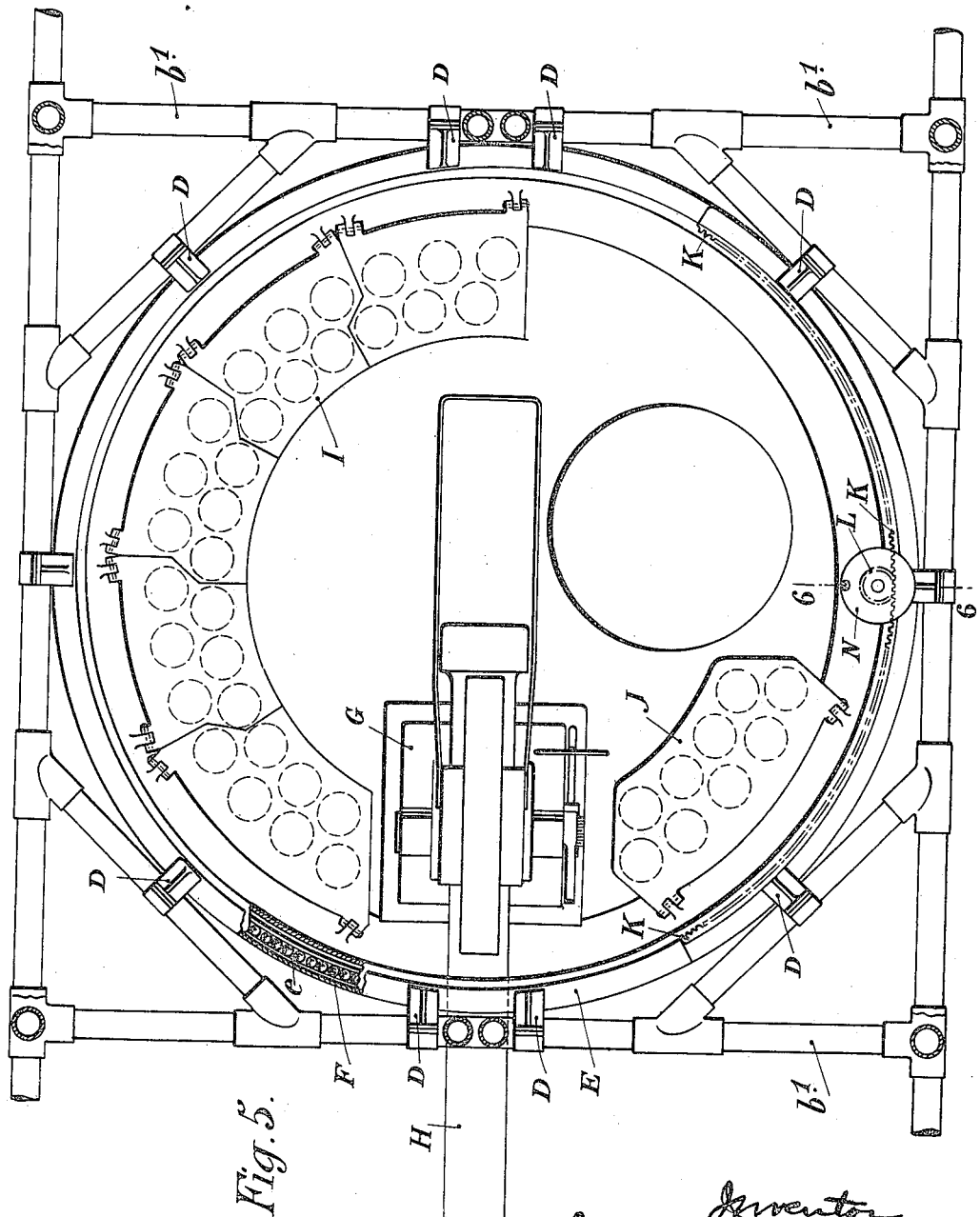

J. J. M. A. E. SCHNEIDER.
ARMING OF FIGHTING AND OTHER AEROPLANES.
APPLICATION FILED MAY 10, 1920.

1,383,242.

Patented June 28, 1921.

J. J. M. A. E. SCHNEIDER.
ARMING OF FIGHTING AND OTHER AEROPLANES.
APPLICATION FILED MAY 10, 1920.
1,383,242.
Patented June 28, 1921.
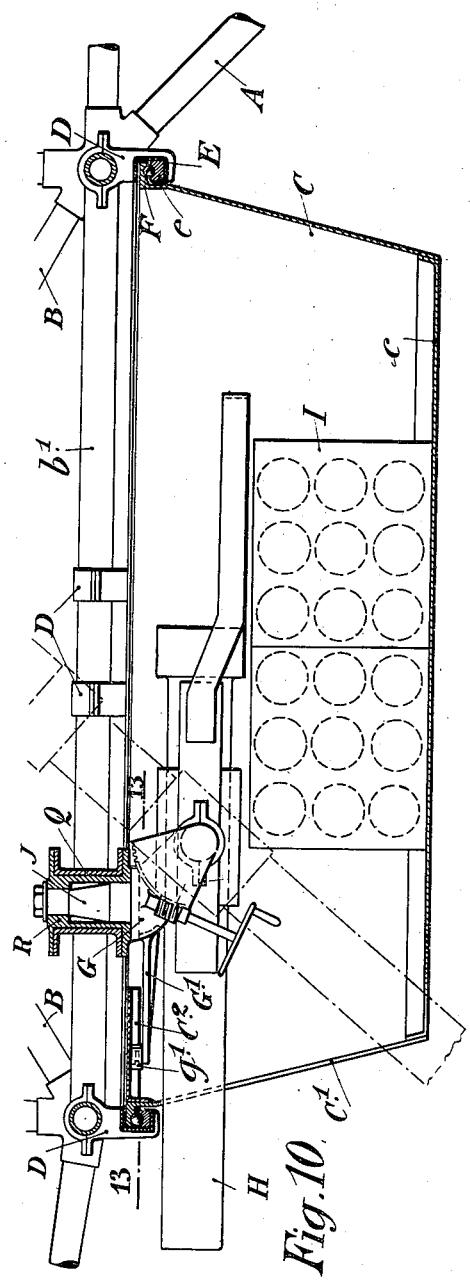

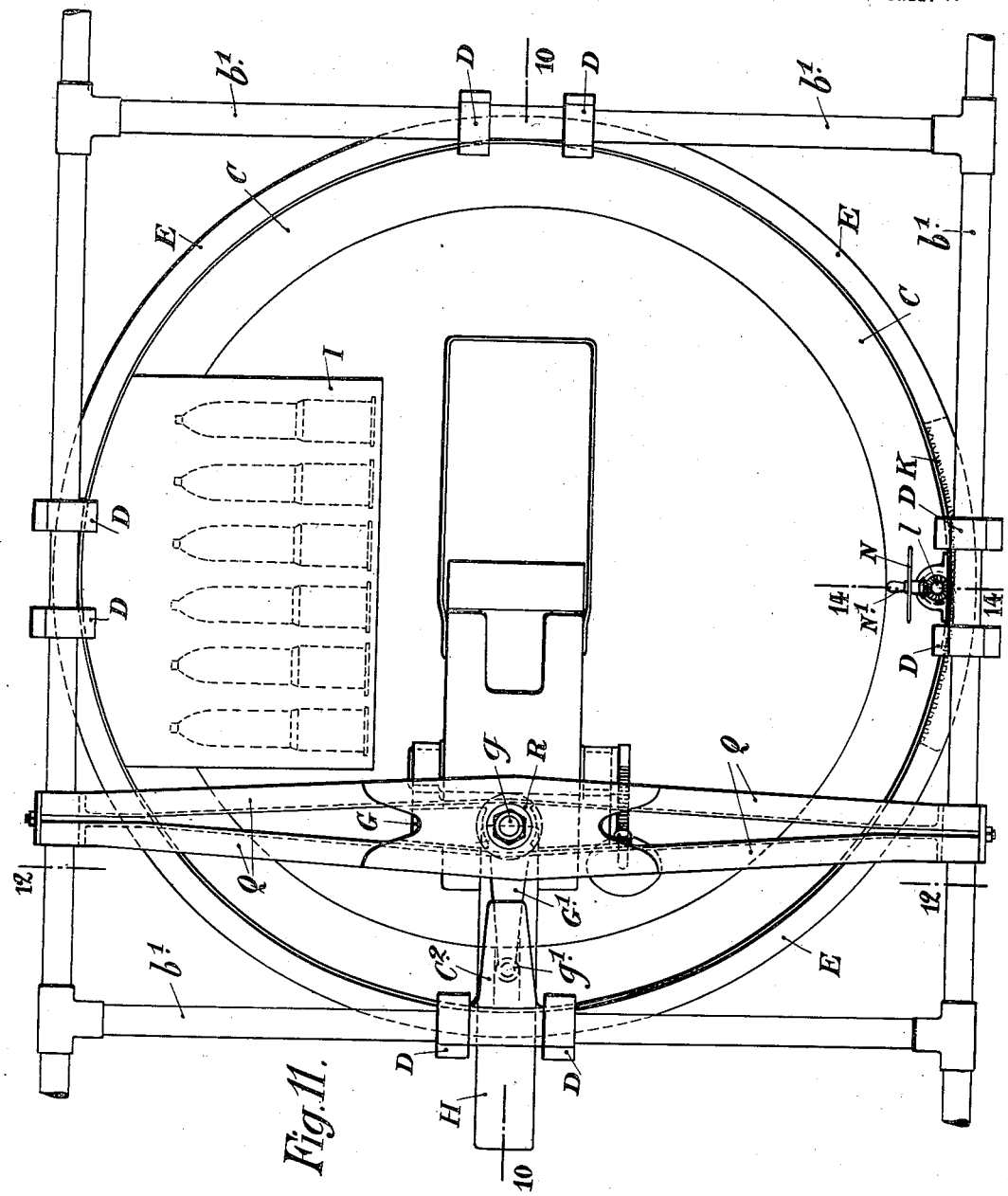

J. J. M. A. E. SCHNEIDER.
ARMING OF FIGHTING AND OTHER AEROPLANES.
APPLICATION FILED MAY 10, 1920.

1,383,242.

Patented June 28, 1921.
10 SHEETS—SHEET 8.

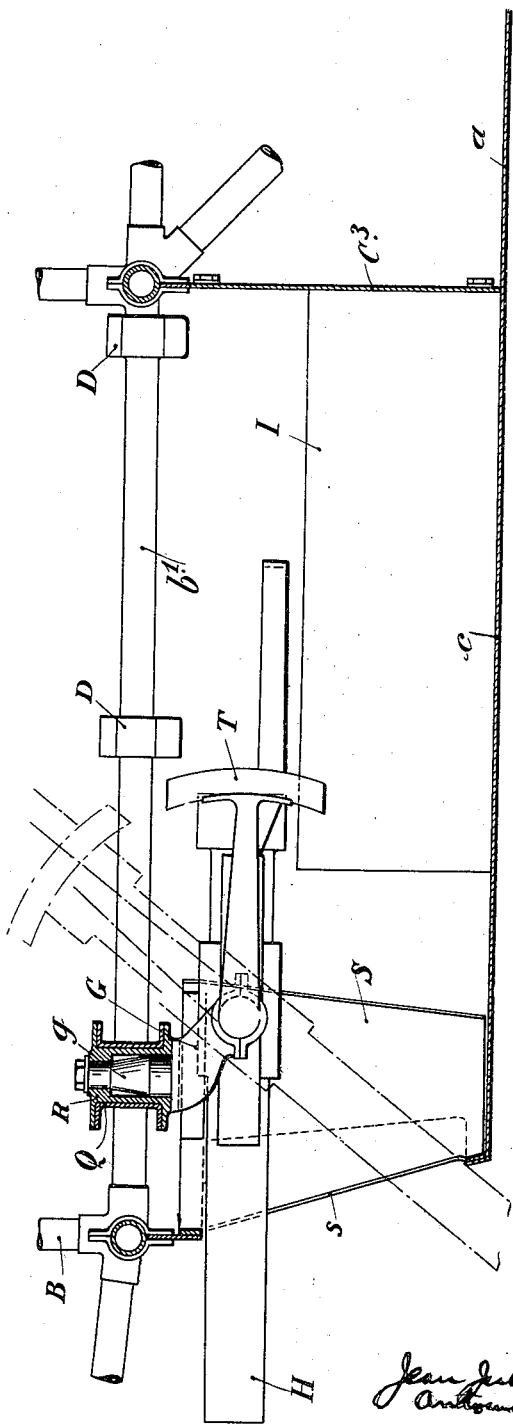

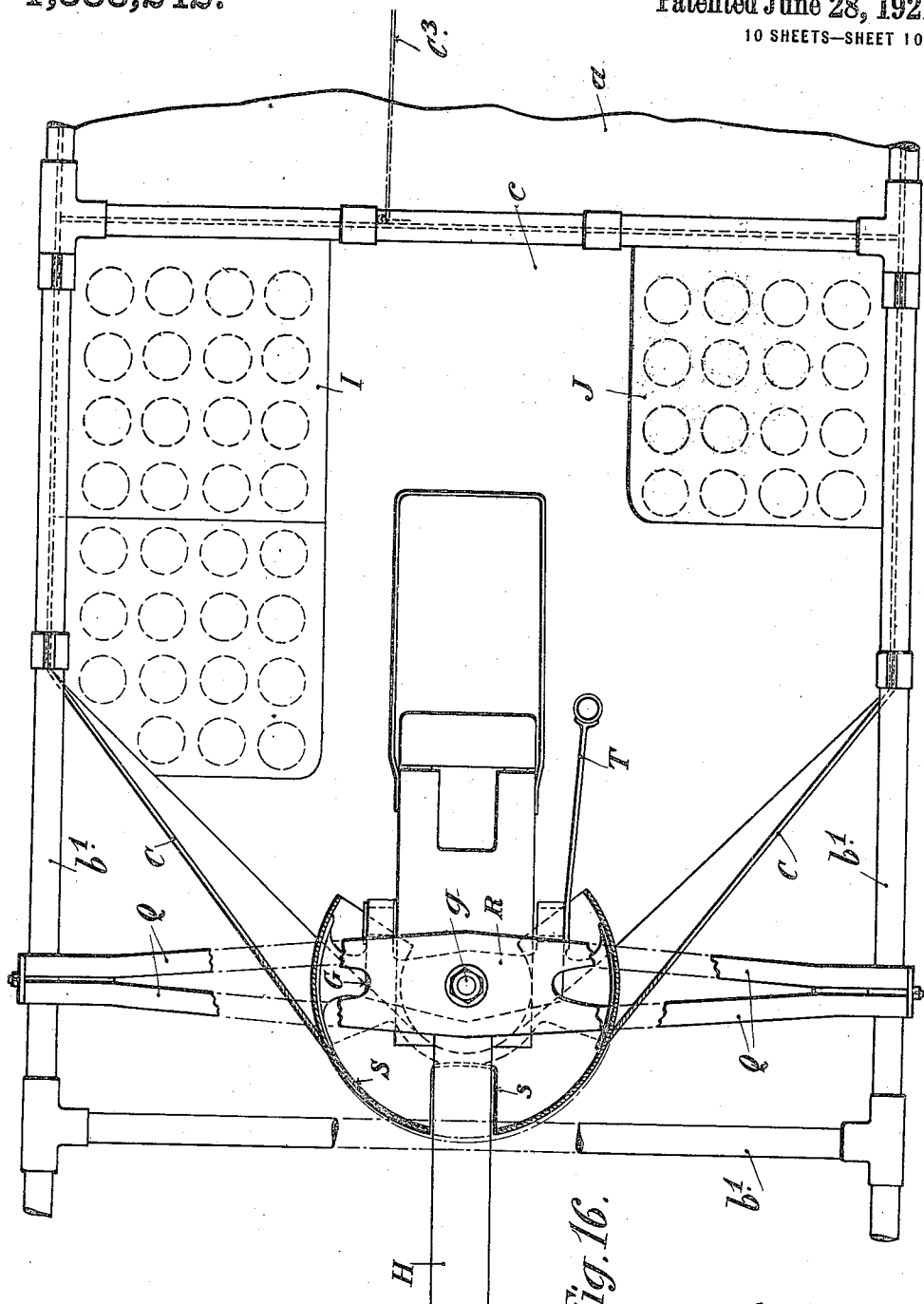

UNITED STATES PATENT OFFICE.

JEAN JULES MARIE ANTOINE EUGÈNE SCHNEIDER, OF PARIS, FRANCE.

ARMING OF FIGHTING AND OTHER AEROPLANES.

1,383,242.

Specification of Letters Patent.   Patented June 28, 1921.

Application filed May 10, 1920. Serial No. 380,262.

*To all whom it may concern:*

Be it known that I, JEAN JULES MARIE ANTOINE EUGÈNE SCHNEIDER, a citizen of the Republic of France, residing at Paris, France, have invented new and useful Improvements in the Arming of Fighting and other Aeroplanes, which invention is fully set forth in the following specification.

This invention has for its object to provide improved apparatus for the arming of fighting and other aeroplanes.

According to this invention, the fore-part of the aeroplane fuselage is of less depth than the main body of said fuselage and supports on the bottom of the fore-nose thus formed, a turret carrying a gun. The fore-nose thus constitutes a higher floor of the fore-part of the fuselage which may be armed in the usual manner with a machine gun or a gun of small bore. The armament comprises, altogether, in the fore-part of a fuselage of normal height, a combinatiton of the usual machine gun or small-bore gun with a gun of larger bore capable of being trained in a horizontal direction.

Various constructional forms of this invention are illustrated by way of example in the accompanying drawings in which:—

Figures 1 and 2 illustrate respectively in diagrammatic longitudinal elevation and front view, one form of the improved installation of the armament on a fighting aeroplane according to this invention.

Figs. 3 to 9 inclusive illustrate in detail a constructional example of the turret suspended from the bottom of the fore-nose B.

Fig. 4 is a vertical section taken along the axis of the aeroplane.

Fig. 5 is a plan in partial section.

Figure 6:
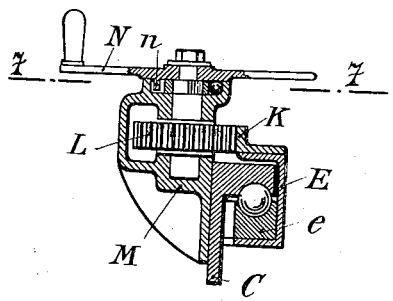
Figure 7:
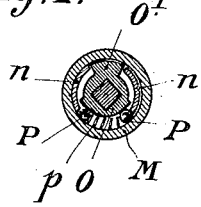

Figs. 6 and 7 illustrate on a larger scale respectively in vertical section on the line 6—6 of Fig. 5, and in horizontal section on the line 7—7 of Fig. 6, a fastening which allows of fixing the turret in any position of training of the gun.

Figure 8:
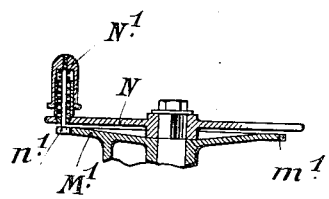
Figure 9:
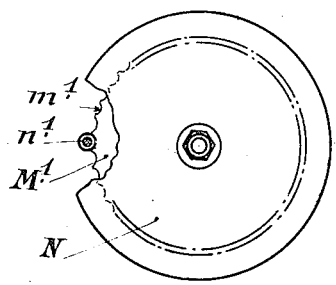

Figs. 8 and 9 illustrate respectively in vertical section and in plan another constructional example of this fastening.

Fig. 10 is a vertical longitudinal section on the line 10—10 of Fig. 11, illustrating the bottom of the fore-nose B of the fuselage with the turret suspended from the latter.

Fig. 11 is a corresponding plan.

Figure 12:
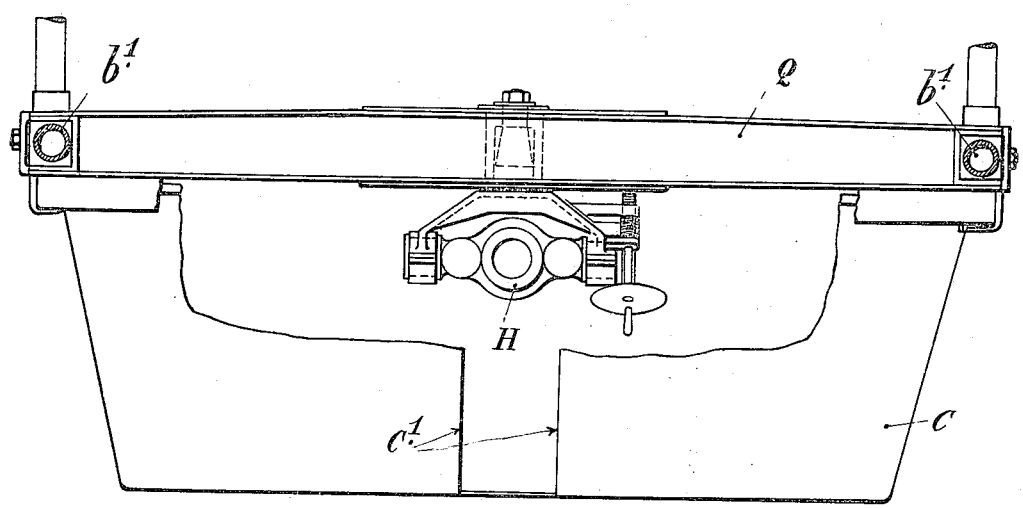

Fig. 12 is a vertical section on the line 12—12 of Fig. 11.

Figure 13:
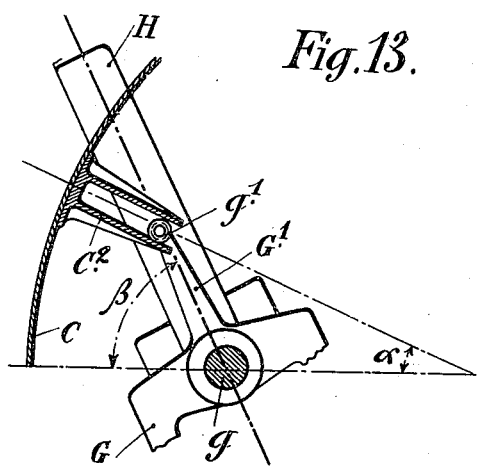

Fig. 13 is a horizontal section on the line 13—13 of Fig. 10, showing the positions occupied respectively by the gun barrel H and the turret C after an angular displacement $\alpha$ of the latter.

Figure 14:
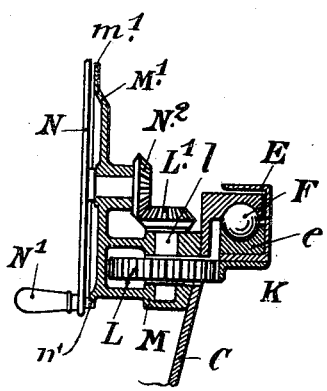

Fig. 14 is a detail vertical section on a larger scale on the line 14—14 of Fig. 11.

Figs. 15 and 16 are respectively a vertical section along the axis of the aeroplane and a plan in partial section of another constructional example of the invention.

Figure 1:
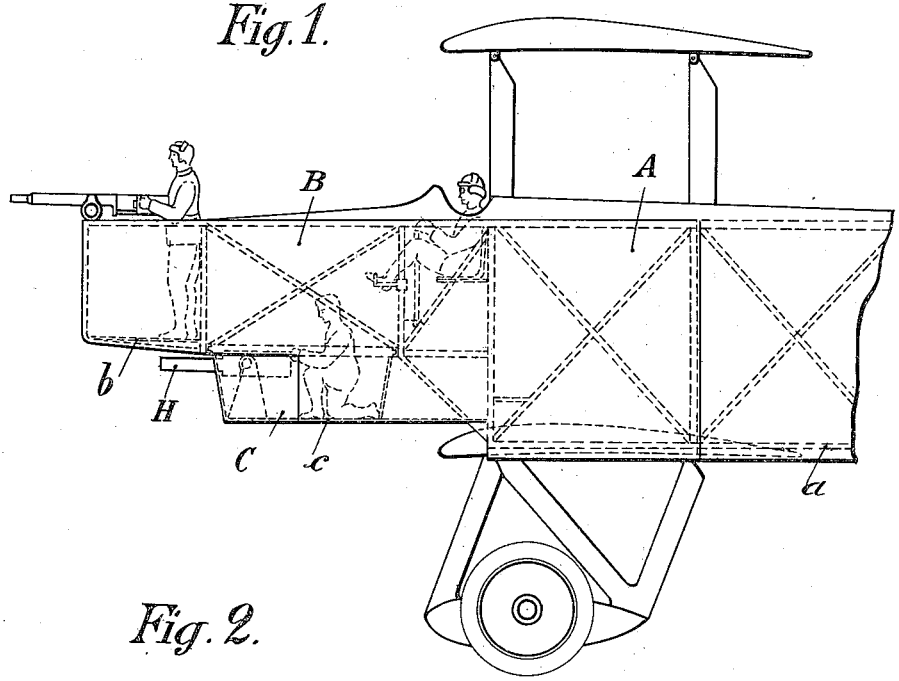
Figure 2:
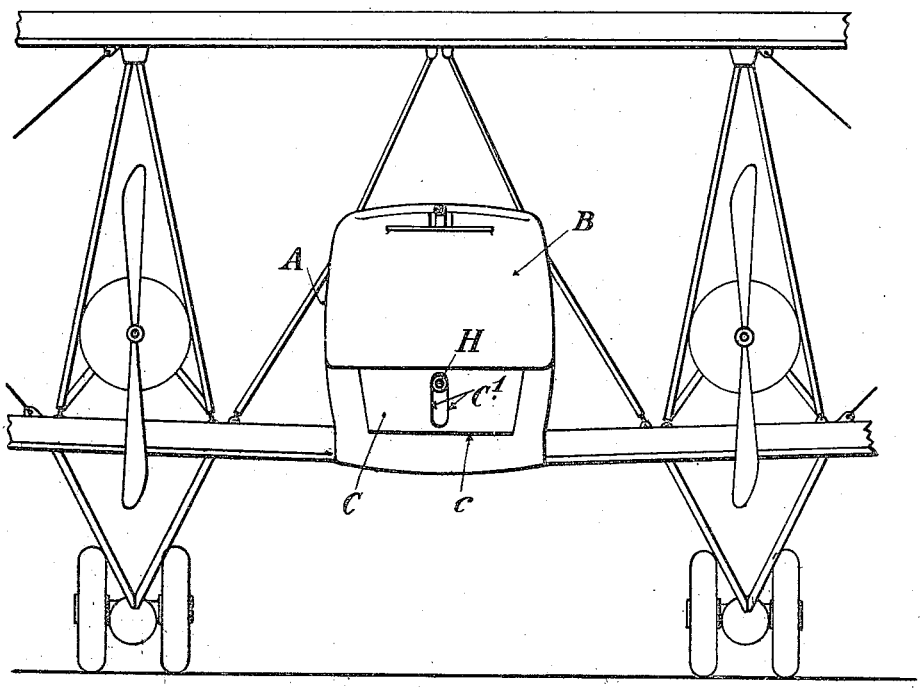
Figure 3:
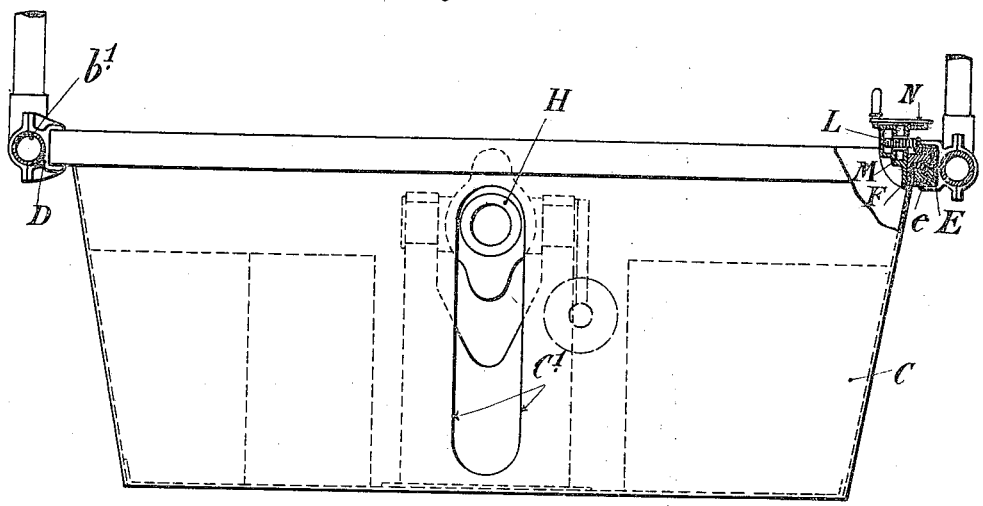
Fig. 3 is a front view.

In Figs. 1 and 2, A is the fuselage body of any known construction, but characterized by the feature that its fore-part is cut away at the base or reduced in depth in such a manner as to form a fore-nose B, the top of which is on the same level as that of the body A, while the bottom $b$ is situated at a higher level than that of the floor $a$. The bottom $b$ of the fore-nose B forms a support for a turret C in which the gun is mounted, the turret being mounted beneath the rear part of the fore-nose and adjacent to the main body part of the fuselage. The bottom or floor $c$ of the turret may be on the same level or on a level very slightly higher than that of the floor $a$. Thus the fore-part of the fuselage comprises two platforms or floors at different levels $c$ and $b$, namely one floor $b$ for the gunner in charge of the usual machine gun or small-bore gun, and the other floor $c$ for the gunner intrusted with the control of the gun mounted in the turret suspended from the bottom of the fore-nose B.

Referring to Figs. 3 to 7 the fore-nose of the fuselage A carries by means of brackets D, a ring E of U or other shaped cross section, and which constitutes a race by means of a ring $e$ for balls F on which the inverted turret C rests by means of a flange of suitable complementary shape.

This turret carries a gun carriage G and has an embrasure $C^1$ through which the gun H projects and can move in its elevation movements.

In the turret C there may be arranged permanently chests I for a store of ammunition and a chest J situated within reach of the gunner always stocked with ammunition in case it should be necessary to give a very rapid fire.

On the upper limb of the U where the rolling track is arranged there is fixed a toothed sector K with which there meshes a pinion L journaled in a bracket M fixed to the turret C.

N is a hand wheel for actuating the pinion L and thus causing the turret to revolve around its axis in one or the other direction according to the desired training of the gun.

The gunner is able at all times to lock the pinion L in a stationary position by causing an engagement between the hand wheel N and the bracket M.

In the example illustrated in detail in Figs. 6 and 7, this engagement is effected by a self-locking clutch. The axle of the pinion L carries a cam O of arc-shape eccentric relatively to the said axle. Between the periphery of this cam and the inside wall of the lodgment formed by the bracket M, there are arranged balls P which a spring has a constant tendency to press against the segments $n$ projecting from the hub of the hand wheel N, which latter is loose on the axle of the pinion. These segments $n$ constantly clamp between them a nose $O^1$ which is diametrally opposite the cam O and is fixed to the latter.

Normally there is always a jamming of the balls between the driving cam O of the pinion and the hand wheel loose on the axle of the latter. The disengagement is effected only by the actuation of the hand wheel N which forces away one of the balls P and causes the cam O to be carried around by the action of the opposite segment on the nose $O^1$ of the cam.

Figs. 8 and 9 illustrate another form of the locking clutch.

In this example, the hand wheel N is fixed on the axle of the pinion L, and is provided with a spring handle $N^1$ having an axially extending finger $n^1$ normally engaged in one of the notches $m^1$ of a disk $M^1$ fixed to the bracket M. The gun server liberates the turret by depressing the spring handle $N^1$ in view of actuating the pinion L in one or the other direction.

In the form shown in Figs. 10 to 14 the longitudinals $b^1$ of the bottom of the fore-nose B support a girder Q arranged at right angles to the axis of the aeroplane, and at the center of which is a bearing R for the vertical pivot pin $g$ of a small suspended gun carriage G. This pivot pin is appreciably eccentric relatively to the turret. The small gun carriage has a laterally projecting horizontal arm $G^1$ situated in the vertical axial plane of the gun. This arm carries at its free end a roller $g^1$ which is guided in a slot guide $C^2$ extending radially from the inner wall of the turret C.

Owing to the eccentric situation of the pivot pin $g$, the gun barrel describes the maximum angle $\beta$ of the lateral deviation (Fig. 13) for a very substantially smaller angular displacement $\alpha$ of the turret C.

Fig. 14 illustrates the detail construction of the mechanism for actuating and locking the turret. The axle $l$ of the driving pinion L is in this case arranged vertically in the bracket M fixed to the turret C. This axle carries a bevel pinion $L^1$ meshing with a pinion $N^2$ fixed on the horizontal axle of the hand wheel N.

As in the example shown in Figs. 8 and 9, the hand wheel N is provided with a spring handle $N^1$ carrying a finger $n^1$ normally engaged in one of the notches $m^1$ of a disk $M^1$ formed on the bracket M.

Figs. 15 and 16 are respectively a vertical section along the axis of the aeroplane and a plan in partial section, of a constructional example in which the turret C, suspended from the fore-nose B of the fuselage, is fixed. The turret has in this case an embrasure of suitable dimensions for permitting the training movement of the combined gun barrel H and cylindrical shield S carried by the small gun carriage G. This small gun carriage may, as in the preceding example, be supported by a vertical pivot pin $g$ in a bearing R formed in a girder Q carried by the longitudinals $b^1$ of the bottom of the fore-nose B of the fuselage.

The training movements of the gun barrel and shield, like the elevation movements of the gun barrel in the slot $s$ of the shield, may be produced by hand in the usual manner by the action of the gun server upon a shoulder-piece T.

In the rear wall of the fixed turret C there may be formed a door $C^3$.

The floor of the bottom $c$ of the turret may, in all constructional forms, be connected to a gangway floor $a$ of the bottom of the fuselage body A.

Having now particularly described and ascertained the nature of my said invention and in what manner the same is to be performed, I declare that what I claim is:—

1. In an aeroplane, the combination of the fore-nose of the fuselage, a gun turret revolubly suspended beneath said fore-nose, and means for revolving said turret.

2. In an aeroplane, the combination of the fore-nose of the fuselage, a turret suspended beneath said fore-nose, a rack and pinion engagement between said fore-nose and said turret, whereby the latter may be revolved, and locking means for securing the turret in adjusted position.

3. In an aeroplane, the combination of a fuselage having a fore-nose of less depth than the main body part of said fuselage to constitute an upper floor, and an inverted turret mounted beneath the fore-nose to constitute a lower floor, said floors forming platforms for gun operators at different heights in the aeroplane.

4. In an aeroplane, the combination of the fore-nose of the fuselage, a gun turret revolubly suspended beneath and supported by said fore-nose, a girder extending horizontally across and at right angles to the axis of the aeroplane, and a gun carriage supported by said girder.

5. In an aeroplane, the combination of the fore-nose of the fuselage, a gun turret revolubly suspended beneath and supported by said fore-nose, a girder extending horizontally across and at right angles to the axis of the aeroplane, a gun carriage supported by said girder eccentric to said turret, and a radial arm on said carriage engaging a fixed guide on said turret.

6. In an aeroplane, the combination of the fore-nose of the fuselage, a gun turret revolubly mounted beneath and supported by said fore-nose and provided with a gun embrasure, a gun carriage mounted in said turret, a gun and an embrasure shield on said carriage, and means for rotating said turret.

7. In an aeroplane, the combination of a fuselage having a fore-nose of less depth than the main body part of said fuselage to constitute a floor at a higher level than the floor of said main body part, and an inverted turret mounted beneath the rear part of the fore-nose and adjacent to the main body part of the fuselage to constitute a floor at approximately the same level as the floor of said main body part, the floors of said fore-nose and said turret forming platforms for gun operators at different heights in the aeroplane.

8. In an aeroplane, the combination of a fuselage having a fore-nose of less depth than the main body part of said fuselage to constitute a floor at a higher level than the floor of said main body part, and means suspended beneath the rear part of the fore-nose and adjacent to the main body part of the fuselage to constitute a floor at approximately the same level as the floor of said main body part, the floors of said fore-nose and said suspended means forming platforms for gun operators at different heights in the aeroplane.

Dated this 22nd day of March, 1920.

In testimony whereof I have signed this specification.

JEAN JULES MARIE ANTOINE EUGÈNE SCHNEIDER.

Witnesses:
    ANDRÉ MOSTICKER,
    LOUIS GARDET.